United States Patent
Menjak et al.

(10) Patent No.: US 7,306,535 B2
(45) Date of Patent: Dec. 11, 2007

(54) VEHICLE STEERING DEVICE AND METHOD

(75) Inventors: Ratko Menjak, Frankenmuth, MI (US); Steven J. Collier-Hallman, Frankenmuth, MI (US); Karen A. Boswell, Freeland, MI (US); Damir Menjak, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 138 days.

(21) Appl. No.: 10/879,599

(22) Filed: Jun. 29, 2004

(65) Prior Publication Data

US 2005/0288143 A1 Dec. 29, 2005

(51) Int. Cl.
*B62D 11/06* (2006.01)

(52) U.S. Cl. .................. 475/29; 74/388 PS; 74/498; 74/650; 180/444

(58) Field of Classification Search .............. 475/29; 74/650, 388 PS, 498; 180/443, 444
See application file for complete search history.

(56) References Cited

U.S. PATENT DOCUMENTS

| | | | |
|---|---|---|---|
| 3,172,299 A * | 3/1965 | Musser .................. 74/388 PS |
| 4,044,274 A * | 8/1977 | Ohm ........................ 310/83 |
| 4,530,413 A * | 7/1985 | Buike et al. ............... 180/444 |
| 4,688,655 A | 8/1987 | Shimizu |
| 4,956,590 A * | 9/1990 | Phillips ..................... 318/432 |
| 5,050,697 A | 9/1991 | Umemura |
| 5,123,300 A * | 6/1992 | Himmelein et al. ......... 74/640 |
| 5,205,371 A | 4/1993 | Karnopp |
| 6,012,347 A * | 1/2000 | Hasegawa .............. 74/388 PS |
| 6,164,150 A | 12/2000 | Shindo et al. |
| 6,199,654 B1 | 3/2001 | Kojo et al. |
| 6,250,420 B1 | 6/2001 | Brenner et al. |
| 6,454,044 B1 | 9/2002 | Menjak et al. |
| 6,598,695 B1 | 7/2003 | Menjak et al. |
| 6,655,493 B2 | 12/2003 | Menjak et al. |
| 6,655,494 B2 | 12/2003 | Menjak et al. |
| 6,664,711 B2 | 12/2003 | Baudendistel |
| 6,691,819 B2 | 2/2004 | Menjak et al. |
| 6,705,419 B2 | 3/2004 | Menjak et al. |
| 6,708,794 B2 | 3/2004 | Menjak et al. |
| 6,763,907 B2 * | 7/2004 | Ueno et al. ................. 180/444 |
| 6,938,724 B2 * | 9/2005 | Yamamori et al. .......... 180/446 |
| 2001/0027895 A1 | 10/2001 | Murata et al. |
| 2003/0021862 A1 | 1/2003 | Kroeger et al. |
| 2004/0070189 A1 | 4/2004 | Nakatsu et al. |
| 2004/0093138 A1 | 5/2004 | Hasegawa et al. |

FOREIGN PATENT DOCUMENTS

| | | |
|---|---|---|
| EP | 0317390 | 5/1989 |
| JP | 2003261048 | 9/2003 |
| JP | 2004-026022 | 1/2004 |
| JP | 2004-050853 | 2/2004 |
| JP | 2004042829 | 2/2004 |

* cited by examiner

*Primary Examiner*—David D. Le
(74) *Attorney, Agent, or Firm*—Michael D. Smith

(57) ABSTRACT

A vehicle steering device may include a rotatable input shaft, a motor in communication with an input augmentation shaft, the input augmentation shaft and the input shaft sharing a longitudinal axis, and the motor further having a stator stationary with respect to rotation of the input shaft. The vehicle steering device may further include a differential mechanism for providing variable ratio steering to the steering device. The differential mechanism may be a harmonic drive differential or a planetary gearing system. In one embodiment, an external wave generator may be used within the harmonic drive differential gearing mechanism. The vehicle steering device may include a sensorless synchronous machine.

20 Claims, 12 Drawing Sheets

VEHICLE STEERING DEVICE AND METHOD

BACKGROUND

This invention relates generally to vehicle steering devices, and more particularly, this invention relates to vehicle steering devices having variable ratio steering.

Motor vehicles, such as cars and trucks, require a steering system to control the direction of travel of the vehicle. The steering system controls the direction of travel of the vehicle through the control of one or more sets of road wheels. Such steering systems commonly transmit a driver's intent from a steering wheel to the road wheels via a mechanical steering linkage. Thus, movement of the steering wheel by the driver causes a corresponding movement of the road wheels. Hydraulic and/or electric motor assisting systems are commonly used in combination with such mechanical systems. These assisting systems reduce the driver effort necessary to actuate the mechanical system.

For a vehicular steering system with active steering, such as that used in an automotive active front steering system, a given motion of the hand-wheel to an input shaft may be supplemented by an additional motion, such as that from a differential steering actuator, including, for example, an augmentation motor, to an output shaft, translating into a motion of the steerable road wheels that does not necessarily correspond to the given motion of the hand-wheel. Consequently, when the differential steering actuator is inactive, the motion of the steerable road wheels directly corresponds to the hand-wheel motion due to the articulated mechanical linkage, just as in conventional systems.

The term "active steering" relates to a vehicular control system, which generates an output that is added to or subtracted from the front steering angle, wherein the output is typically responsive to the yaw and/or lateral acceleration of the vehicle. Active front control steering may improve vehicle handling stability on a variety of road conditions. Stability control may be continuously active. For higher vehicle speeds, vehicle sensitivity of steering may be smaller. At lower vehicle speeds, park solution sensitivity may be increased and driver workload reduced. Thus, in some situations, an active steering control system may react more quickly and accurately than an average driver to correct transient handling instabilities. In addition, active steering can also provide for variable steering ratios in order to reduce driver fatigue while improving the feel and responsiveness of the vehicle. For example, at very low speeds, such as that which might be experienced in a parking situation, a relatively small rotation of the hand-wheel may be supplemented using an active steering system in order to provide an increased steering angle to the steerable road wheels.

Active Front Steering "AFS" typically uses a differential mechanism to achieve a controlled ratio change or position augmentation. These mechanisms possess characteristics that make inclusion in an automotive steering system difficult. These characteristics include lash from input to output, friction to ground, and the speed change through the differential device.

U.S. Pat. No. 6,199,654 shows a vehicle steering apparatus that has an electric motor connected with a steering shaft and thus the electric motor assembly rotates together with the steering wheel. The electric motor (stator) is rotated and has a spiral cable for electric power for any angle of the steering shaft in the connected electric motor. Since all of the embodiments of the apparatus include a stator of the electric motor rotating together with the steering shaft, a spiral cable is implemented to maintain electrical continuity for proper functioning of this apparatus. Rotation of a complete electric motor has large inertial forces and has additional assembly of a spiral cable that has additional issues including noise, friction, inertia, and durability.

BRIEF SUMMARY

Disclosed herein, in an exemplary embodiment, is a vehicle steering device including a rotatable input shaft, an input augmentation shaft, the input augmentation shaft and input shaft sharing a longitudinal axis, and a motor in communication with the input augmentation shaft. The motor further includes a motor stator wherein the motor stator is stationary with respect to rotation of the input shaft.

Also disclosed herein, in another exemplary embodiment, is a vehicle steering device including a rotatable input shaft, a motor, and an differential mechanism for providing variable ratio steering to the steering device. The differential mechanism may include a flex spline, a circular spline, and an external wave generator surrounding the flex spline, wherein the wave generator is rotated by the motor.

Further disclosed herein, in yet another exemplary embodiment, is a method of providing variable ratio steering to a vehicle steering device including providing an electronic control unit, sensing rotation of an input shaft of the vehicle steering device and sending a first signal to the electronic control unit, sending a second signal to a motor, the motor having a stator, wherein the second signal dictates rotation of an input augmentation shaft in communication with the motor, the input augmentation shaft sharing a common longitudinal axis with the input shaft, rotating the input augmentation shaft as determined by the second signal, wherein the input augmentation shaft rotates an differential mechanism, the differential mechanism connecting the input shaft to an output shaft of the vehicle steering device, and maintaining the stator stationary with respect to rotation of the input shaft and output shaft.

BRIEF DESCRIPTION OF THE DRAWINGS

The embodiments will now be described, by way of an example, with references to the accompanying drawings, wherein like elements are numbered alike in the several figures in which.

DETAILED DESCRIPTION OF EXEMPLARY EMBODIMENTS

The exemplary embodiments relate with vehicle active front steering systems wherein the control steering system may include sensors such as, but not limited to, torque, position, yaw, lateral acceleration and vehicle speed sensors. Signals from these sensors may be sent to an electronic control unit ("ECU"). ECU may detect signals and provide input signals to output determinate control to control the position of the electric motor to achieve desired effects.

Figure 1:
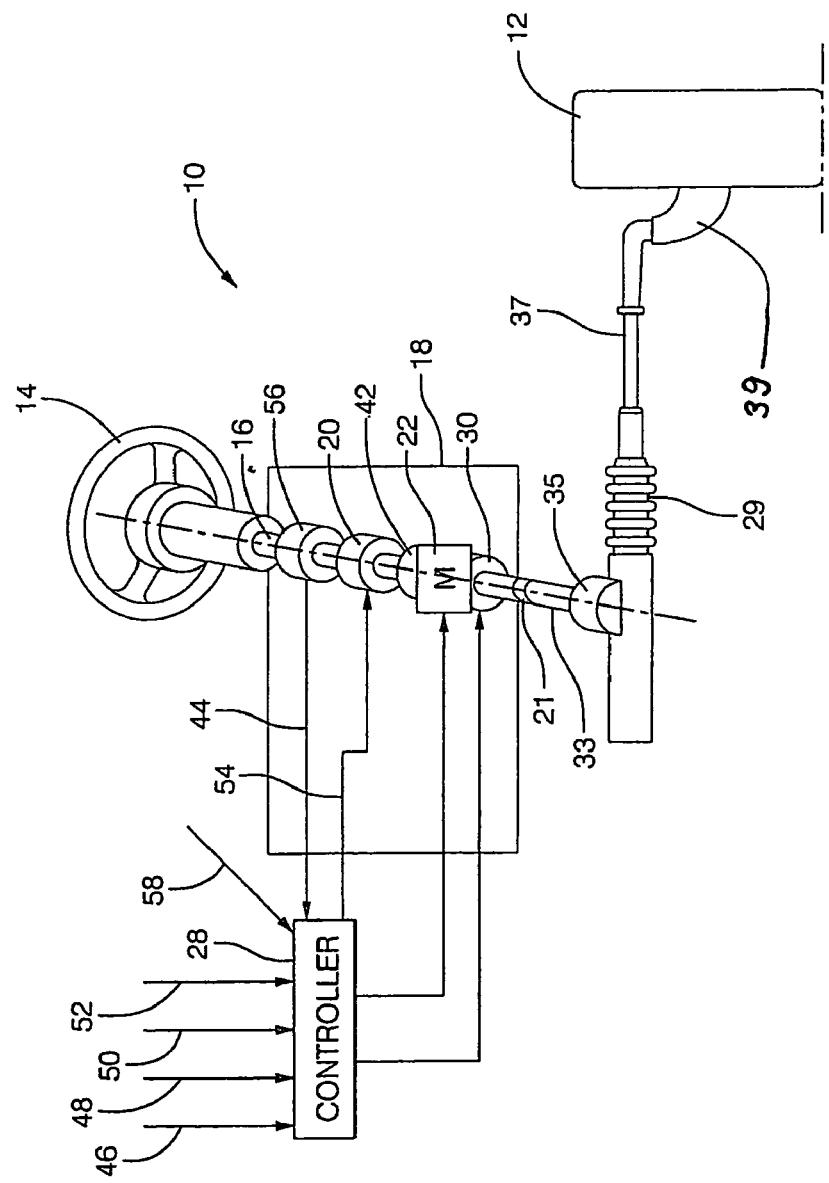
FIG. 1 is a schematic perspective view of a steering system of a vehicle.

FIG. 1 shows an exemplary steering system 10 of a vehicle. The steering system 10 may be included in a motor vehicle having front wheel steering capability. Steering system 10 may be configured to provide for the active control of the steerability of the front steerable elements of the motor vehicle by mechanically adjusting an angle of the steerable wheels in response to sensed input parameters. Such active control compensates for the existence of a limit handling situation deduced from the sensed input parameters and is generally independent of the control exercisable by an operator of the motor vehicle. Oftentimes, depending upon the magnitude of the sensed input parameters, any compensatory action taken by steering system 10 is undetectable by the operator.

Steering system 10 may alter the direction of travel of the motor vehicle (not shown) by changing the position of road wheels 12 (only one shown) or other vehicular steerable elements (not shown) while the motor vehicle is moving. Steering system 10 may connect a hand wheel 14 to a steering shaft 16 which may extend through a housing 18, although the housing may not be included in some embodiments, or may house a different set of elements in other embodiments. The steering system 10 provides the driver with assistance in steering the steerable elements such as road wheels 12. The steering system 10 may include, for example, electric power assisting or hydraulic power assisting steering that provide driver assistance.

The driver turns hand wheel 14, which is mechanically connected to a steering shaft 16. The rotational force of hand wheel 14 is transmitted to steering shaft 16, which may be detected by a torque sensor 20 disposed at steering shaft 16 in some embodiments. Torque sensor 20 can measure the torque on steering shaft 16 and send a signal 44 to a controller 28, which may be an electronic control unit "ECU". If a torque sensor 20 is included in an embodiment of the steering system 10, it may be a non-compliant torque sensor, one example of which is described in U.S. Pat. No. 6,655,493 entitled "Steering Column with Non-Compliant Torque Sensor", which is wholly incorporated herein by reference. In addition to the torque sensor 20, the sensed input parameters to the controller 28 may further include, but are not limited to, a vehicle velocity signal 46 from a vehicle velocity sensor (not shown), a lateral acceleration signal 48 from a lateral accelerometer (not shown), a steerable wheel angle signal 50 from a wheel angle sensor (not shown), a yaw angular velocity signal 52 from a yaw rate sensor, a position signal 54 from a position sensor 56, and a steering gear angle signal 58 from the torque and position sensors 20, 56. Although the torque sensor 20 and position sensor 56 may be separate sensors, they may also provided in a combined module that includes both torque and position sensors. Plural sensors may be provided for redundancy. Additionally, it should be understood that any combination of the above-described sensors may be employed in the system 10. An analysis and quantification of signals 44, 46, 48, 50, 52, 54, and 58, or subset of such signals, enables the controller 28 to derive output signals that are ultimately utilized to vary the angle of the steerable elements 12 with respect to the straight direction of travel of the motor vehicle.

After receipt of any one signal, or a combination of several signals, or all of the signals from the above-described sensors, controller 28 may send a signal to motor 22 to begin operation. The motor 22 may, in some embodiments, have the same centerline and longitudinal axis as the shaft 16. Motor 22, which may be in mechanical communication with a differential mechanism 42, may provide turning assistance to steering shaft 16. The differential mechanism 42 may be an epicyclic mechanism, which includes such mechanisms as harmonic drive differential mechanisms (also known as strain wave gearing), planetary gear systems, and cycloidal drives. As steering shaft 16 turns, an intermediate shaft portion 33, which may be connected through a universal joint 21, may rotate a pinion gear (not shown) located under a gear housing 35. Rotation of such a pinion gear (not shown) moves a rack 29, which moves a tie rod 37. When tie rod 37 moves, it turns a steering knuckle 39, which steers road wheels 12. Motor 22 may be in operable communication with a brake 30 to lock the motor when the system is not active. It should also be noted that when input rotation is from a driver only, it is possible to have a magnetorheological fluid stopper instead of a motor brake or mechanical lock mechanism.

While a particular exemplary steering system 10 has been described, it should be understood that the embodiments of a vehicle steering device for use in the steering system 10 may also be used in steering systems having different combinations of parts and features and/or different arrangements of parts and features, or additional parts and features not specifically described. That is, the steering system 10 is only one possible steering system that may utilize embodiments of a vehicle steering device described herein.

As will be further described with respect to each embodiment, the exemplary embodiments of a vehicle steering device disclosed herein may include an electric motor (stator) which is stationary relative to the steering shaft and does not need a spiral cable because the stator does not change position. The rotor may rotate when the controller provides electrical power. The rotor of the electric motor may be connected to an epicyclic differential mechanism to achieve the active front steer function. In one embodiment, the epicyclic differential mechanism may be a harmonic drive with the rotor of the motor connected to a wave generator.

Figure 2:
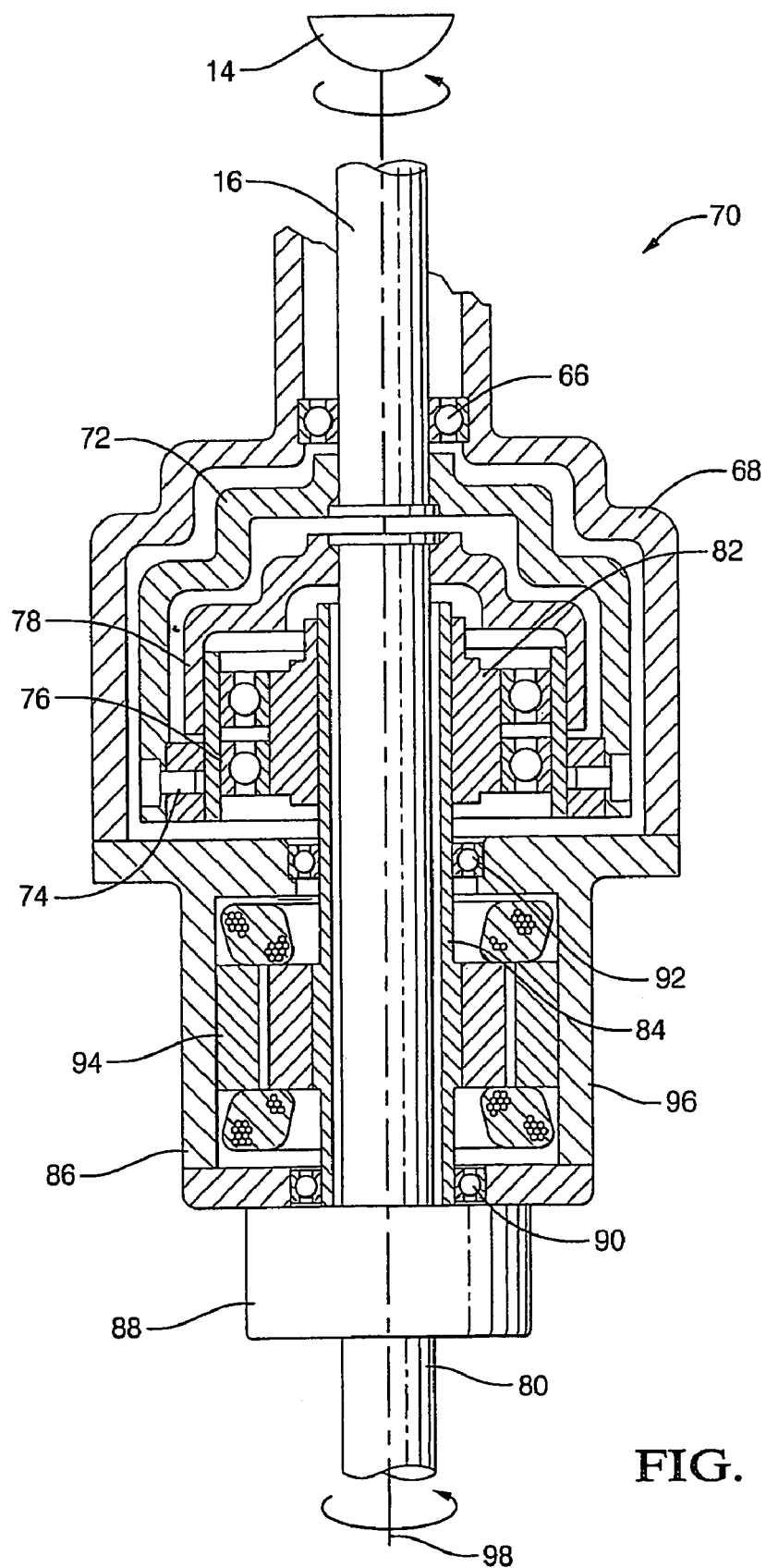
FIG. 2 is a side cross-sectional view of one embodiment of a vehicle steering device for use in the steering system of FIG. 1.

FIG. 2 shows one embodiment of a vehicle steering device 70 that employs a harmonic drive mechanism where a motor rotates a wave generator. A wave generator may be an egg-shaped member which flexes diametrically opposite portions of the surrounding flex-spline gear which may be inside an outer gear. As the diametrically opposite teeth of the flex-spline gear contact the teeth on the outer gear, the rotatable one of the gears rotates with respect to the non-rotatable one of the gears. The flex-spline gear may have less teeth (e.g. two less teeth) than the outer gear, so that every time the wave generator rotates one revolution, the flex-spline gear and outer gear may shift by the number of teeth that the flex spline has less than the outer gear (e.g. two).

As further shown in FIG. 2, a driver may rotate a hand wheel 14 and a steering shaft 16, which form an input to the device 70. Alternately, it should be understood that the entire mechanism may be inverted without changing the function of the system. That is, the output 80 may be the "input" 80 with a hand wheel 14 positioned, in this case, on the shaft 80. In this case also, the steering shaft 16 would be the output for the system. Thus, the systems disclosed herein may include systems where the motor is positioned closer to the hand wheel 14 than the differential mechanism. In either embodiment, the differential mechanism that attaches to the shaft 16 may be housed within housing 68 through which the shaft 16 may be supported within on bearings 66 so that the housing is stationary with respect to movement of the shaft 16. When the shaft 16 is the steering shaft, and thus the input shaft for the system, the shaft 16 may rotate a support 72 and circular spline 74. The circular spline 74 may be part of a harmonic drive differential and may give input rotation to a flex spline 76. Flex spline 76, with dynamic spline 78, may give output rotation to output (lower) shaft 80. It should be noted that the flex spline 76 has a length, as defined along the longitudinal axis of the device 70, which is at least long enough to engage both the circular spline 74 and the dynamic spline 78. The circular spline 74 may be a pancake-type harmonic drive (having two bearings at the wave generator) differential transmission and may be a rigid ring with internal teeth engaging the teeth of flex spline 76. Flex spline 76 may be a non-rigid ring with external teeth on a slightly smaller pitch diameter than circular spline 74.

The harmonic drive is also known as a strain wave gearing because the wave generator introduces a strain wave to the flex spline. The harmonic drive used in these embodiments may be a pancake-type set that provides the advantages of harmonic drive gears in a flatter configuration, thus providing more compact size and lighter weight. Advantages of the harmonic drive gearing include the teeth engagement pattern, where approximately 30% of the teeth may be engaged at all times within a harmonic drive gear, as opposed to just one or two teeth for a spur gear, or maybe up to 6 teeth for a planetary gear. In addition, the teeth of a harmonic drive gear may be engaged on both sides of a tooth flank, thus providing zero backlash since backlash is defined as the difference between the tooth space and the tooth width, which equals 0 for harmonic drive gearing.

The primary input torque necessary for producing a given output torque is essentially a 1:1 ratio. In actuality, a flex spline output torque needs a slight increase in input torque by the factor (R+1)/(R) while a circular spline output requires a slight decrease in input torque by the factor (R)/(R+1). The sizing of a harmonic drive differential is thus the same as for a reducer and is predicated on the required output torque to be delivered. The trim input or holding torque required to the wave generator is essentially the main output torque divided by the product of the tabulated ratio multiplied by the efficiency as a reducer.

Main output torque (lb.-in.)/(Tabulated Ratio) (efficiency)=Trim Torque (lb.-in.).

The flex spline 76 may be fitted over and elastically deflected by a wave generator 82. Dynamic spline 78 may be a rigid ring and may have the same number of internal teeth as flex spline 76. In this embodiment, the dynamic spline 78 also serves as a support through its connection with the output shaft 80. Thus, the dynamic spline 78 may be a one-piece, integral support member for transferring output from the flex spline 76 to the output shaft 80. The dynamic spline 78 is rotated together with flex spline 76 and serves as an output member. Wave generator 82 may be a thin raced bearing assembly fitted onto an elliptical profile, and may be considered the control input member. In another embodiment, a planet carrier, with two or more planet rollers causing a wave generator to strain, may be used to create a strain wave instead of an elliptical thin raced bearing assembly.

Wave generator 82 may be fixed on a hollow rotor shaft 84 of an electric motor 86, which also includes a stator 94 and a motor casing 96. In this embodiment, the hollow rotor shaft 84 may be considered an input augmentation shaft since the rotor shaft 84 may provide additional input to the system when activated to do so by the controller 28. Passing through the hollow rotor shaft 84 may be output (lower) shaft 80. The motor casing 96 and the stator 94 of the electric motor 86 may be stationary relative to the steering shaft 16, and relative to the output shaft 80 and the longitudinal axis 98 of the vehicle steering device 70 as well. Electric motor 86 receives power from controller 28 and the rotor shaft 84 rotates together with wave generator 82 for additional rotation, positive or negative. The electric motor 86 may be positioned on the same shaft with the wave generator 82. When the rotor rotates, the hollow shaft and the wave generator 82 rotate together. The motor and wave generator combination may be provided on the steering column or pinion area. The ratio of the differential mechanism may be selected to optimize the system based on qualities such as, but not limited to, packaging, inertia, motor speed, motor size, noise, and system performance.

At the end of electric motor 86 may be a motor locking mechanism 88, which has the function of locking the motor input into the differential mechanism when the system is off so that driver rotation of the input shaft will result in efficient output shaft rotation. This motor locking mechanism may be, for example, an MRF stopper, electromagnetic clutch, brake, grip, or solenoid. Other safety elements are also within the scope of these embodiments. The rotor shaft 84 of the electric motor 86 may rotate inside bearings 90 and 92 as shown for maintaining the motor casing 96 stationary with respect to rotation. The motor casing 96 and the housing 68 may be joined together, and, although not necessary, the casing 96 and housing 68 may be attached to a stationary fixture within the vehicle.

Figure 3:
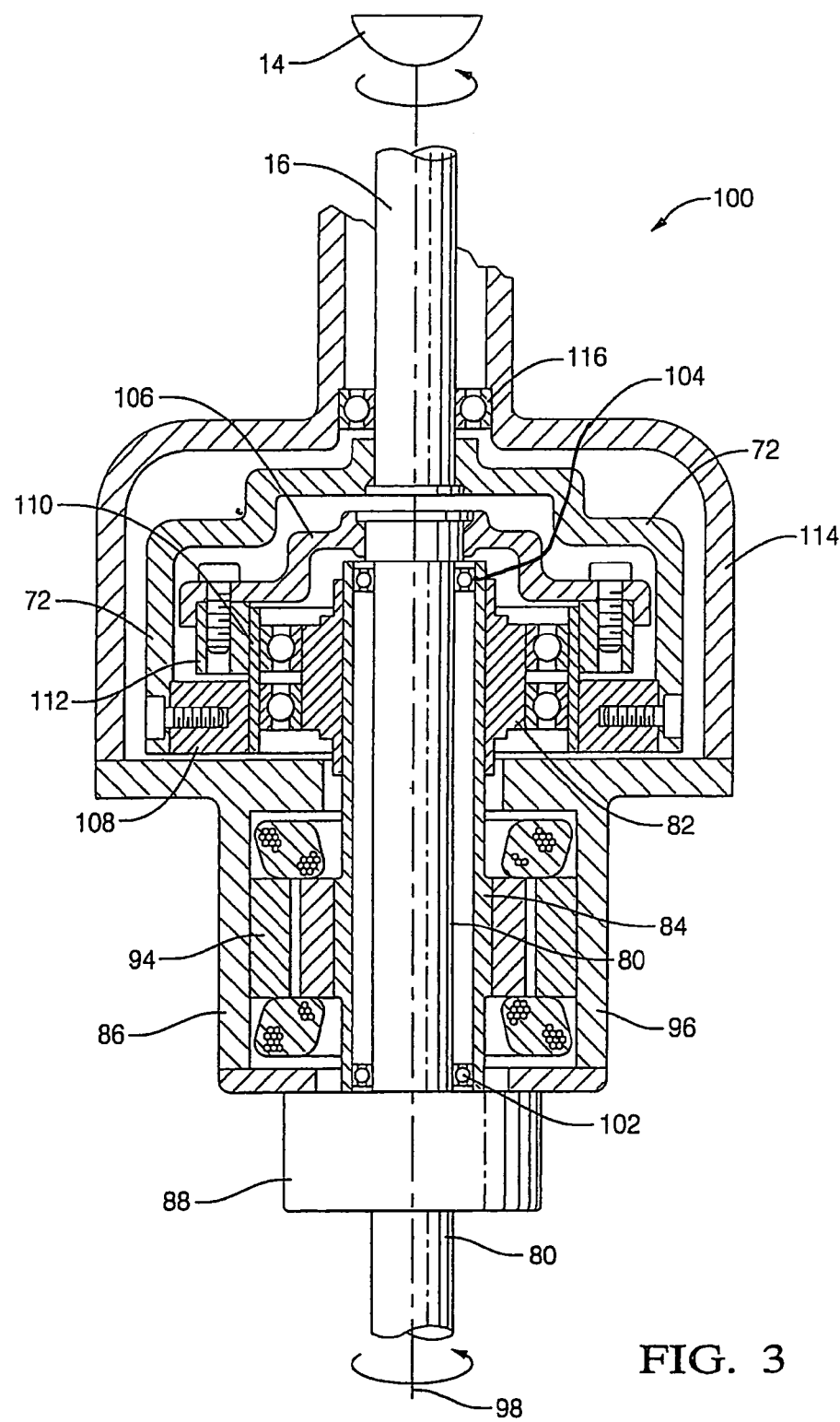
FIG. 3 is a side cross-sectional view of another embodiment of a vehicle steering device for use in the steering system of FIG. 1.

Turning now to FIG. 3, an embodiment of a vehicle steering device 100 is shown. Vehicle steering device 100 is similar to vehicle steering device 70 of FIG. 2, however vehicle steering device 100 includes bearings 102 and 104. Bearings 102 and 104 may be positioned between hollow rotor shaft 84 and output shaft 80 for decreasing friction felt by the driver due to motor 86. The motor needs to rotate at the input shaft speed to achieve a one to one ratio from the input to output shaft due to the gear ratio. In this condition the inner bearing race and outer bearing race are moving at the same speed thus the related bearing friction is minimized.

Also, vehicle steering device 100 may include connection supports 72 and 106 with flex spline 110 and dynamic spline 112. The connection support 106 may be attached to the dynamic spline 112 so that output from the dynamic spline 112 is passed to the connection support 106. Since the dynamic spline 112 is a toothed member, it may be simpler to construct separate members for the dynamic spline 112 and a support which attaches to the output shaft 80. Otherwise, the vehicle steering device 100 may function in a similar manner as the vehicle steering device 70, such that the steering shaft 16 rotates the support 72, which in turn rotates the circular spline 108, the flex spline 110, the dynamic spline 112, and the connection support 106. Alternatively, if the handwheel 14 is placed on the shaft 80 as described above with respect to FIG. 2, then the shaft 80 would be the input (steering) shaft, and the shaft 16 would be the output shaft, and the rotation of elements would be reversed. The shaft 16 may be supported within a housing 114 via bearings 116. And, as in the previous embodiment, all of the above-described rotation may occur independent of the motor casing 96 and stator 94, and the housing 114 which houses the differential mechanism.

Figure 4:
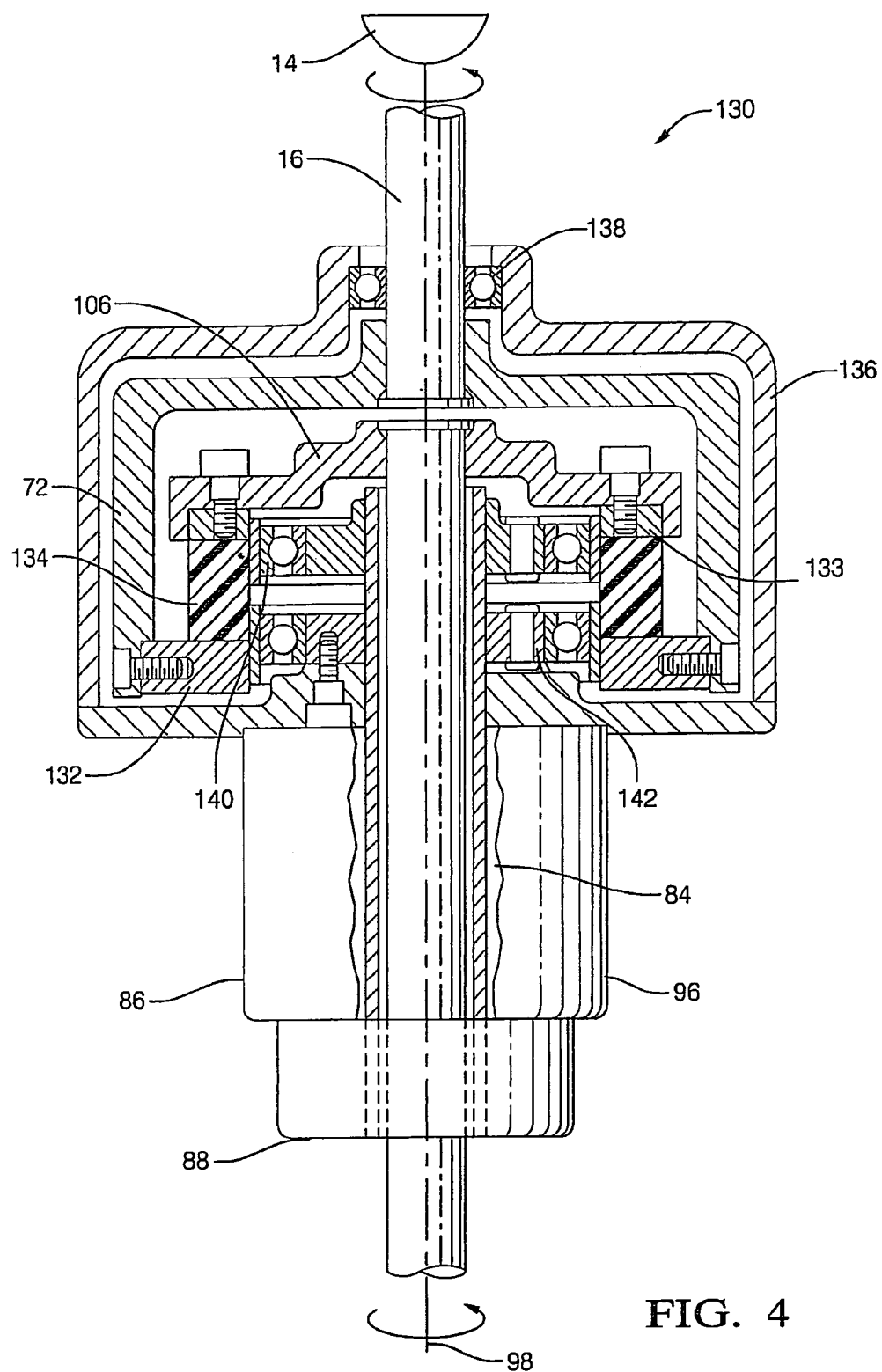
FIG. 4 is side cross-sectional view of another embodiment of a vehicle steering device for use in the steering system of FIG. 1.

FIG. 4 shows an exemplary vehicle steering device 130 with a harmonic 1:1 differential transmission, such that the ratio may be 1:1. Support 72 connects to first rigid spline 132, which serves the same function as the circular spline from previous embodiments. A first wave generator 142 is positioned within first rigid spline 132. A second rigid spline 134 surrounds both the first wave generator 142 and a second wave generator 140. A third rigid spline 133, which serves the same function as the dynamic spline from previous embodiments, surrounds only the second wave generator 140 and is connected to the support 106 which in turn is connected to output shaft 80. A pair of flex splines may be positioned such that a first flex spline is positioned between the rigid splines 132, 134 and the wave generator 142, and a second flex spline is positioned between the rigid splines 133, 134 and the wave generator 140. Thus, the vehicle steering device 130 uses two pancake type harmonic drives. Because a pancake-type harmonic differential is not truly 1:1, by putting two pancake type harmonic drives in series, where one has the ratio R/(R+1), and the other has the ratio (R+1)/R, the ratios cancel and a system with a truly 1:1 ratio is the result.

With the motor shaft 84 stationary, the input, steering shaft 16, and output, output shaft 80, rotate with a gear ratio of 1:1. The same would be true if the shaft 80 is connected to the steering wheel 14 and the shaft 16 serves as the output shaft, as described in the previous embodiments. The relative phasing of the input and output may be changed dynamically by rotating the rotor shaft 84. The rotor shaft 84 may be rotated when the motor 86 receives input from the controller 28 to do so. Thus, the rotor shaft 84 is the input augmentation shaft for this vehicle steering device 130. It should be noted again that the motor 86 is designed such that the motor casing 96, and enclosed stator, is stationary relative to movement of the shaft 16, as well as the shaft 80. Likewise, a housing 136, which houses the harmonic differential transmission, may also be stationary while the shaft 16 is rotatably supported within the housing 136 via bearings 138. The housing 136 may be fixedly attached to the motor casing 96. Either or both the housing 136 and the motor casing 96 may be fixedly attached to a fixture within the vehicle. Again, because the motor and stator is stationary with respect to the steering shaft, the incorporation of a spiral cable is not necessary.

Figure 5:
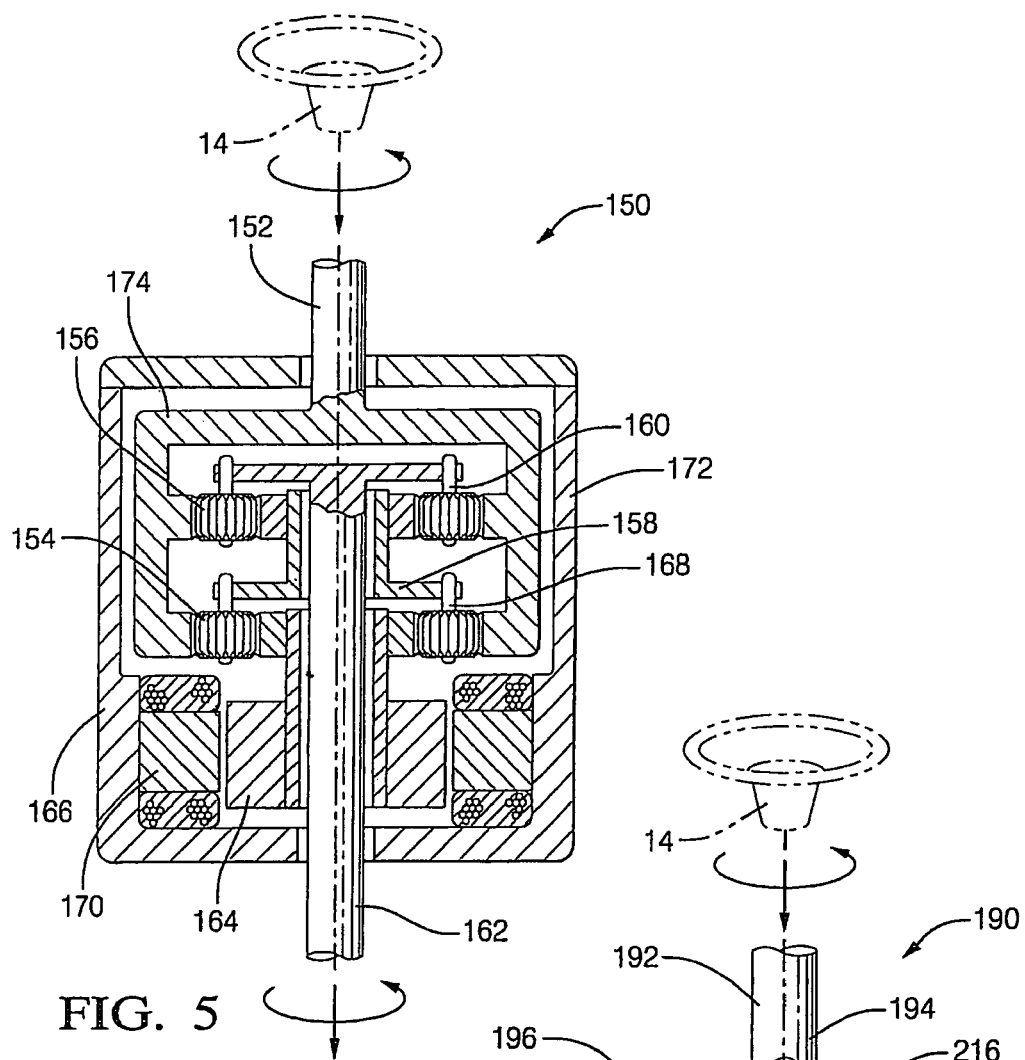
FIG. 5 is a side cross-sectional view of another embodiment of a vehicle steering device for use in the steering system of FIG. 1.

FIG. 5 shows a vehicle steering device 150 having two stage planetary gears as the differential mechanism. A driver may rotate a steering wheel 14 and an input shaft 152. The input shaft 152 may be integrally combined, or separately manufactured and then assembled, with a support 174 which is in engagement with planetary gears 154 and 156. Planetary gear 154 rotates hollow shaft 158, which rotates sun gear 160. Output shaft 162 receives rotation from planetary gear 156 via the sun gear 160. Hollow rotor shaft 164 of electric motor 166 rotates sun gear 168, which is connected to the hollow shaft 158 for additional variable rotation. Thus, the rotor shaft 164 serves as an input augmentation shaft for this vehicle steering device. A casing 172 may include an integral housing for the gearing mechanism and a motor casing for the motor 166. Alternatively, a separate gear housing and motor casing may be used. The casing 172, and the enclosed stator 170 may remain stationary with respect to movement of the input shaft 152. Also, the gearing mechanism is unattached to the casing 172, allowing the casing 172 to remain stationary while rotation of the input shaft 152 and subsequent gear rotations have little to no effect on the casing 172. The output shaft 162 passes through the hollow rotor shaft 164 and thus does not output rotation to the hollow rotor shaft 164, the stator 170, or the casing 172. While the shaft 152 is described as the input shaft and the shaft 162 is described as the output shaft, it should be understood that the hand wheel 14 could be attached to the shaft 162 and the shaft 152 could serve as the output shaft in an inverse of this embodiment.

Figure 6:
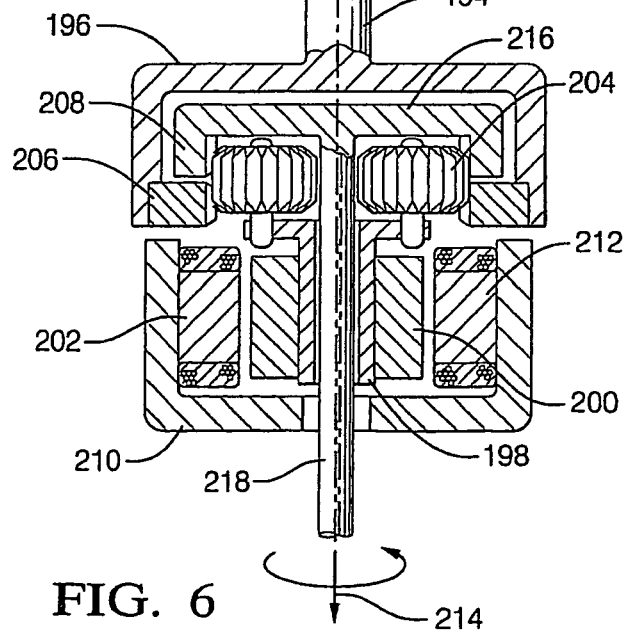
FIG. 6 is a side cross-sectional view of another embodiment of a vehicle steering device for use in the steering system of FIG. 1.

FIG. 6 shows a variable gear unit 190, a vehicle steering device. The differential mechanism of this embodmient, a variable gear ratio, is a reducing unit which includes a differential mechanism using a planet gear. The variable gear unit 190 includes a hand wheel 14 which may rotate an input shaft 192 when turned by a driver. The input shaft 192 may include a shaft portion 194 and a cup-shaped portion 196. The cup-shaped portion 196 may be attached to a ring gear 206. Planet gear 204 has a portion meshing with ring gear 206 and a portion meshing with gear 208. That is, measured along the longituidinal axis 214, a first section of the planet gear 204 meshes with the ring gear 206, and a second section, occupying a distinctly different portion along the longitudinal axis than the first section, meshes with the gear 208. Ring gear 206 has two less teeth than gear 208. Ring gear 206 rotates with a delay by 2 teeth every rotation of the ring gear 206 and therefore operates as a reducing unit. The gear 208 may be integrally connected to a support 216 which is in turn connected to an output shaft 218. Although the gear 208, support 216, and output shaft 218 are shown integrally connected, it would also be within the scope of this embodiment for a pair or all of these elements to be separately manufactured prior to assembling them together in the same orientation as shown. Hollow rotating shaft 198 may rotate together with rotor 200 of motor 202. Thus, the rotating shaft 198 defines an input augmentation shaft for the vehicle steering device 190, as does the rotor 200. The rotating shaft 198 may be attached to planet gear 204. The motor 202 may include a casing 210 which is detached from the gearing system, such that the casing 210 and the stator 212 reamin unaffected by rotation of the gearing system including the planet and ring gears as well as the input shaft 192. The output shaft 218 passes through the hollow rotating shaft 198 and thus the motor 202 is not required to rotate with the output shaft 218. Although not shown, the variable gear unit 190 may further include a gear housing for housing the gearing mechanism. The gear housing may be supported about the input shaft 192 such that the rotation of the input shaft 192 does not translate to rotation of the gear housing. The gear housing may be attached to the motor casing 210, and either or both of the gear housing and motor casing 210 may be fixedly attached to an element within the vehicle which does not rotate with the steering shaft. Furthermore, while the input shaft 192 is described as connected to the hand wheel 14 for receiving input, it should be noted that the hand wheel 14 may be connected to the shaft 218 such that the shaft 192 may serve as the output shaft.

Figure 7:
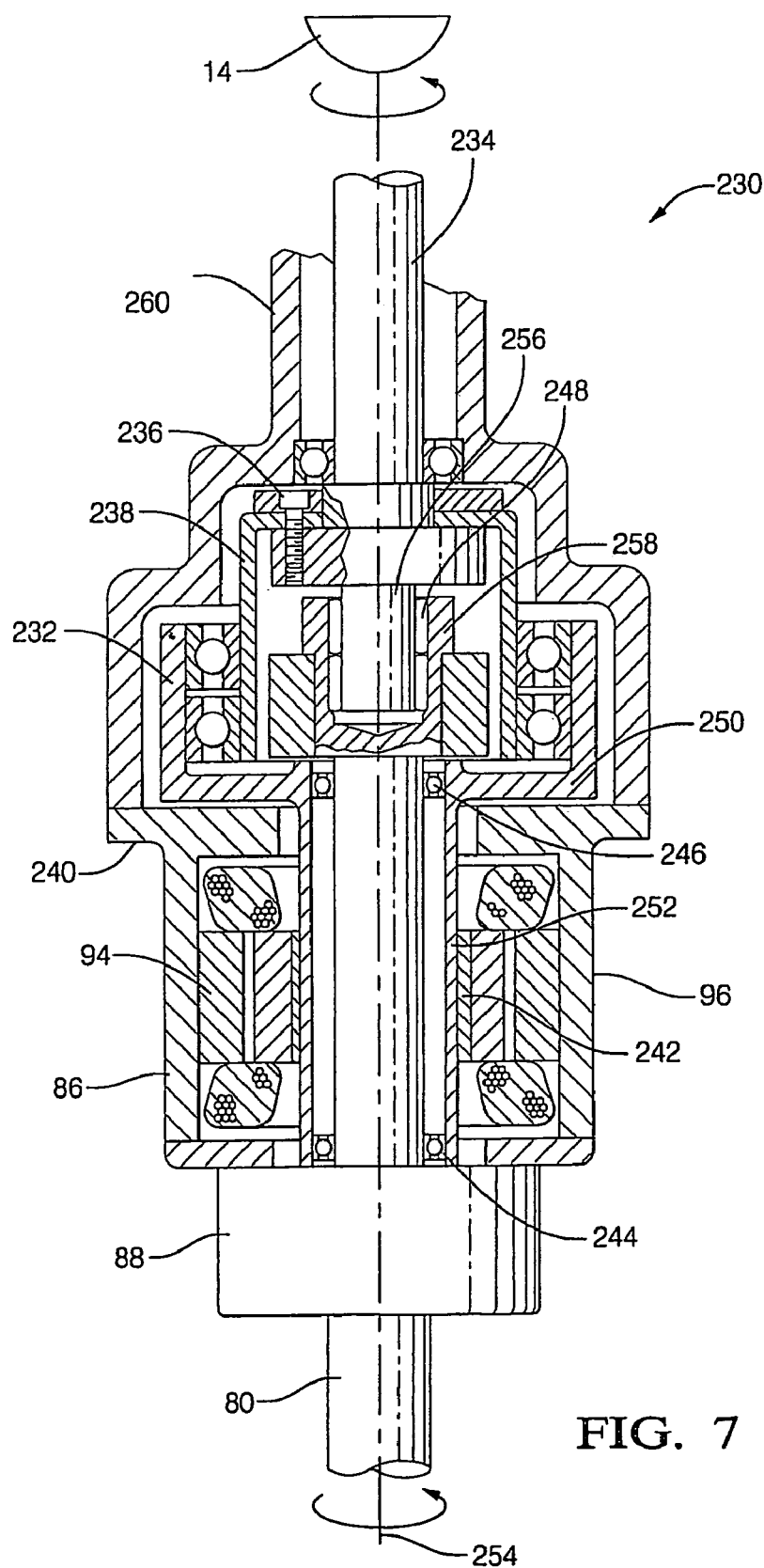
FIG. 7 is a side cross-sectional view of another embodiment of a vehicle steering device for use in the steering system of FIG. 1.

FIG. 7 shows a vehicle steering device 230 where a differential mechanism includes a harmonic drive differential having an external wave generator 232. An external wave generator provides optional design and packaging choices, depending on a particular steering system. With the external wave generator embodiment, the position of input and output shafts may also be advantageously simpler for integration in a steering system. A driver may rotate a hand wheel 14, a steering shaft 234, a support 236, and a flex spline 238. Flex spline 238 may be part of the harmonic drive differential that gives input rotation to a circular spline 240. It should be noted that the steering device 230 is shown at a cross section where the flex spline 238 and the circular spline 240 are not engaged, but it should be understood that a different cross section of the vehicle steering device 230 would show the flex spline 238 engaged with the circular spline 240 at diametrically opposite portions of the circular spline 240. Circular spline 240 gives output rotation to output (lower) shaft 80. Circular spline 240 of differential transmission is rigid with external teeth engaging the teeth of flex spline 238. Flex spline 238 may be a non-rigid ring with internal teeth on a slightly bigger pitch diameter than circular spline 240. The flex spline 238 may be fitted within and elastically deflected by the wave generator 232. In this embodiment, the wave generator 232 is integrated with a support 250 which connects to a hollow rotor shaft 252 of rotor 242. Wave generator 232 is a thin raced bearing assembly fitted into an inner elliptical profile, and normally is the control input member. In another embodiment, a planet carrier, with two or more planet rollers causing a wave generator to strain, may be used to create a strain wave instead of an elliptical thin raced bearing assembly. Passing through hollow rotor shaft 252 is output (lower) shaft 80. Electric motor 86, a radial air gap machine, may be stationary. That is, a motor casing 96 and stator 94 may remain stationary while the input shaft 234 and output shaft 80 rotate. A gear housing 260 may also remain stationary, and may be connected to the motor casing 96. Either or both of the motor casing 96 and the gear housing 260 may be fixed to an element within the vehicle which does not rotate with the steering shaft. Electric motor 86 receives power from the controller 28 (FIG. 1) and the rotor shaft 252 of electric motor 86 rotates together with wave generator 232 for additional rotation, positive or negative. Thus, the rotor shaft 252 serves as an input augmentation device for the vehicle steering device 230. At the end of electric motor 86 may be a safety element 88 that has the function of protecting steering if system fails. This safety element 88 may be, for example, a magneto-rheological fluid ("MRF") stopper, electromagnetic clutch, brake, grip, solenoid, or other suitable safety element. The safety element 88 has the function of stopping rotation of the rotor shaft 252 of motor 86 and wave generator 232 when the system fails. In such a system failure, the rotation will be from input shaft 234 to output shaft 80 without additional input rotation from the motor 86 through wave generator 232. Rotor shaft 252 of electric motor 86 may rotate inside bearings 244 and 246. Bearing 248 ensures that the input shaft 234 and the output shaft 80 remain along the same centerline, the longitudinal axis 254 of the device 230. Portion 256 of the input shaft 234 may be seated within cup shaped portion 258 attached to output shaft 80, however bearing 248 prevents rotation from the input shaft 234 from being transmitted to directly to the output shaft 80. Instead, rotation is transmitted from the input shaft 234 to the support 236, to the flex spline 238, to the circular spline 240, and then to the output shaft 80. Variable rotation is provided by the motor 86 which rotates the rotor shaft 252, which in turn rotates the wave generator 232 which either increases or decreases rotation of the flex spline 238, thus impacting rotation of the circular spline 240 and the output shaft 80. The amount of rotation of the rotor shaft 252 is dictated by the controller 28. Again, while the shaft 234 is described as attached to the hand wheel 14 for input, the hand wheel 14 may instead be attached to the shaft 80, such that the shaft 234 serves as the output shaft in an inverse embodiment of this vehicle steering device.

Figure 8:
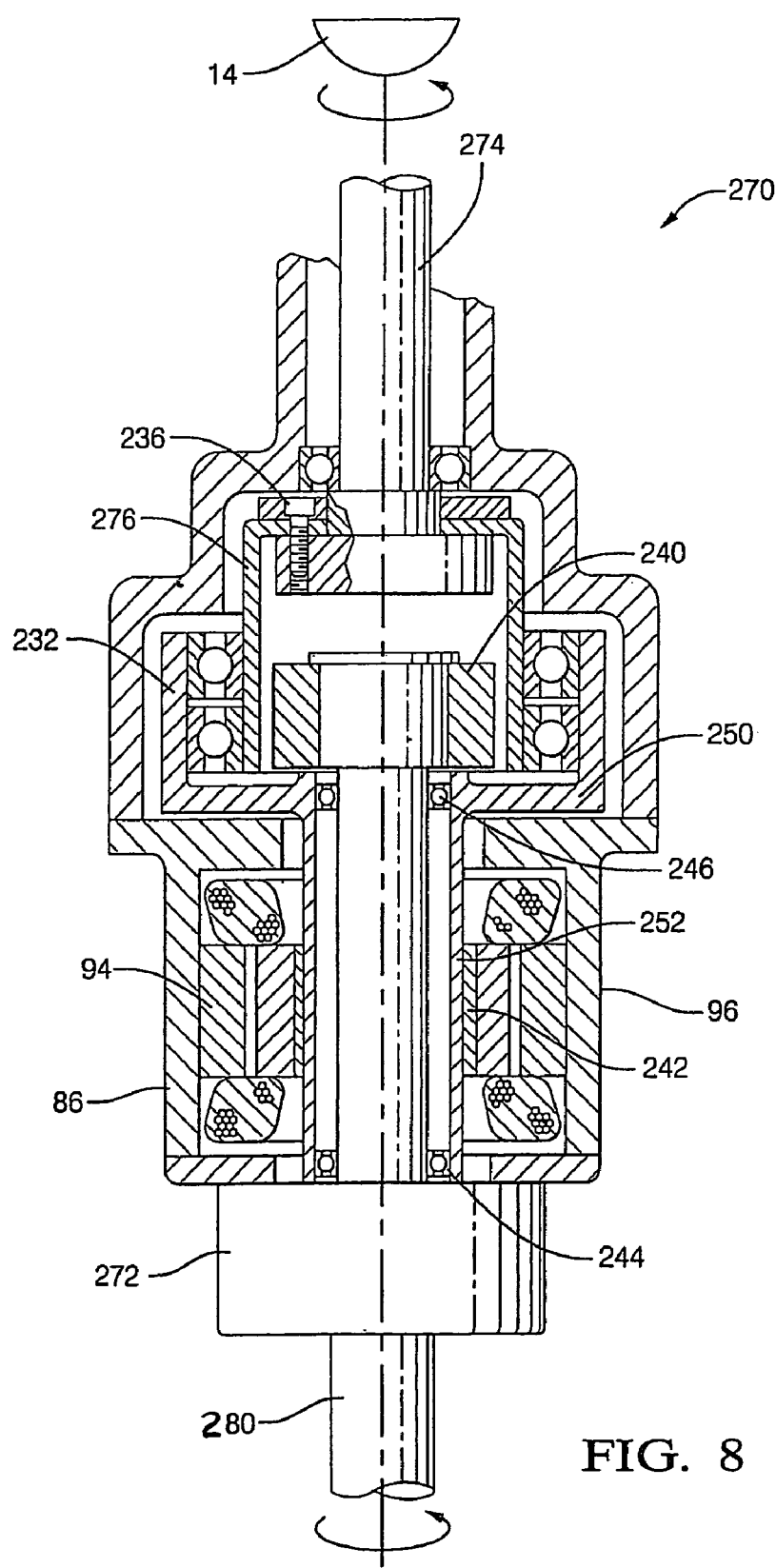
FIG. 8 is a side cross-sectional view of another embodiment of a vehicle steering device for use in the steering system of FIG. 1.

FIG. 8 shows a vehicle steering device 270. While similar to FIG. 7, the input shaft 274 in this embodiment does not include a portion 256 and the output shaft 280 does not include a cup shaped portion 258, and thus does not require a bearing 248 as shown in FIG. 7. The safety element 272 may be similar to the safety element 88 described in FIG. 7. It should be noted again that the motor casing 96 and stator 94 do not rotate with the output shaft 80 because the hollow rotor shaft 252 provides rotation to the wave generator 232, affecting rotation of the output shaft 80 which passes through the motor 86 without rotating it. The motor casing 96 and stator 94 also do not rotate with the input shaft 274 as they are independent of all of the input elements.

Figure 9:
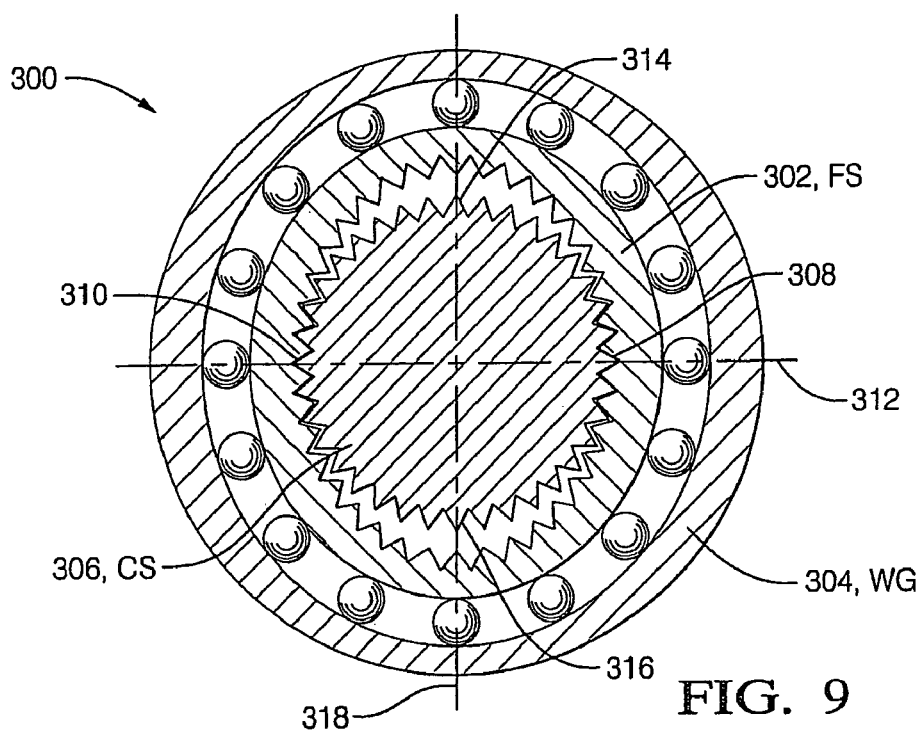
FIG. 9 is a cross-sectional view of a wave generator, circular spline, and flex spline used in the vehicle steering devices of FIGS. 7 and 8.

FIG. 9 shows special differential harmonic drive components 300 using an external wave generator as used in the vehicle steering devices 230 and 270. Primary input rotation is from an input shaft, such as input shafts 234 and 274 as shown in FIGS. 7 and 8, respectively, and from a flex spline ("FS") 302. Input rotation may also be provided from an electric motor, such as motor 86, and external wave generator ("WG") 304, upon receipt of a signal from the controller 28. The result is variable rotation at an output shaft, such as output shaft 80 over circular spline ("CS") 306. From FIG. 9 it can be seen how the flex spline 302 contacts the circular spline 306 at diametrically opposite portions 308, 310 lying along diametrically intersecting line 312, while there is no contact on portions 314, 316 of circular spline 306 which lie along diametrically intersecting line 318. In this example, the diametrically intersecting lines 312 and 318 are perpendicular. It should further be understood, however, that as the flex spline 302 rotates, different portions of the circular spline 306 will make contact with the flex spline 302.

As previously described, characteristics that make inclusion of geared mechanism difficult in an automotive steering system include lash from input to output and friction to ground, in addition to the speed change through the differential device. The exemplary embodiments described herein may completely eliminate lash while keeping friction to ground to an absolute minimum.

Figure 10:
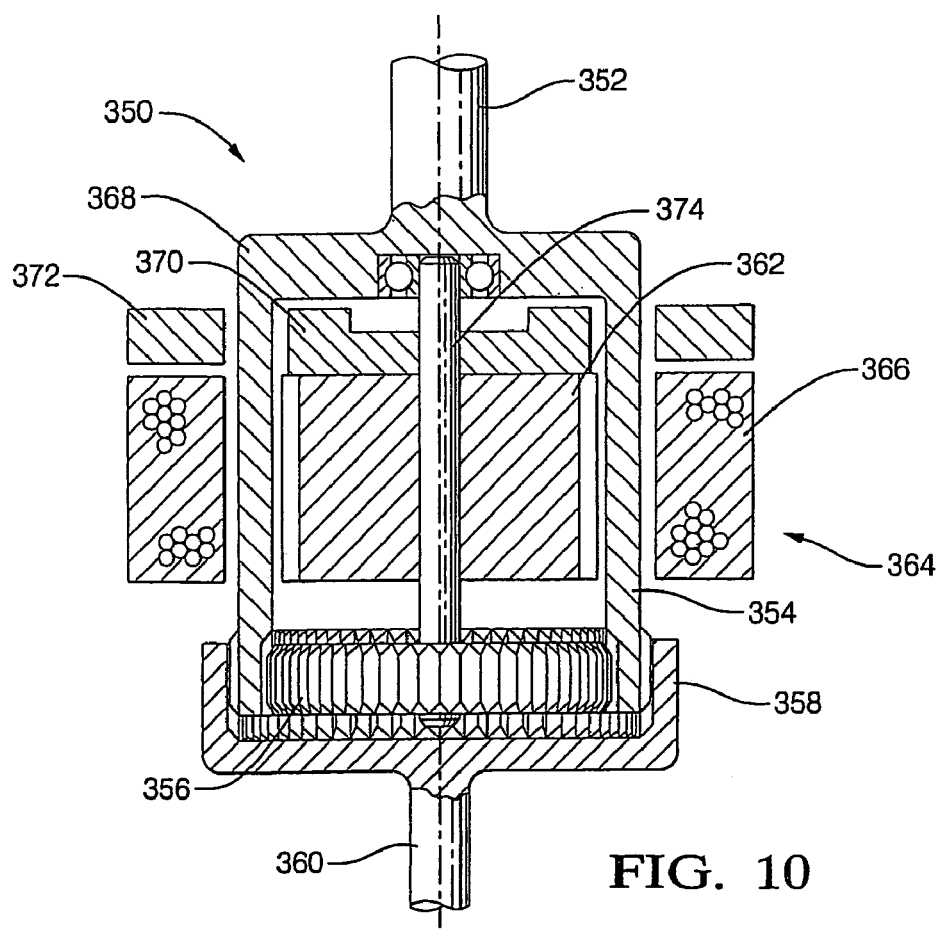
FIG. 10 is a side cross-sectional view of another embodiment of a vehicle steering device for use in the steering system of FIG. 1.
Figure 11:
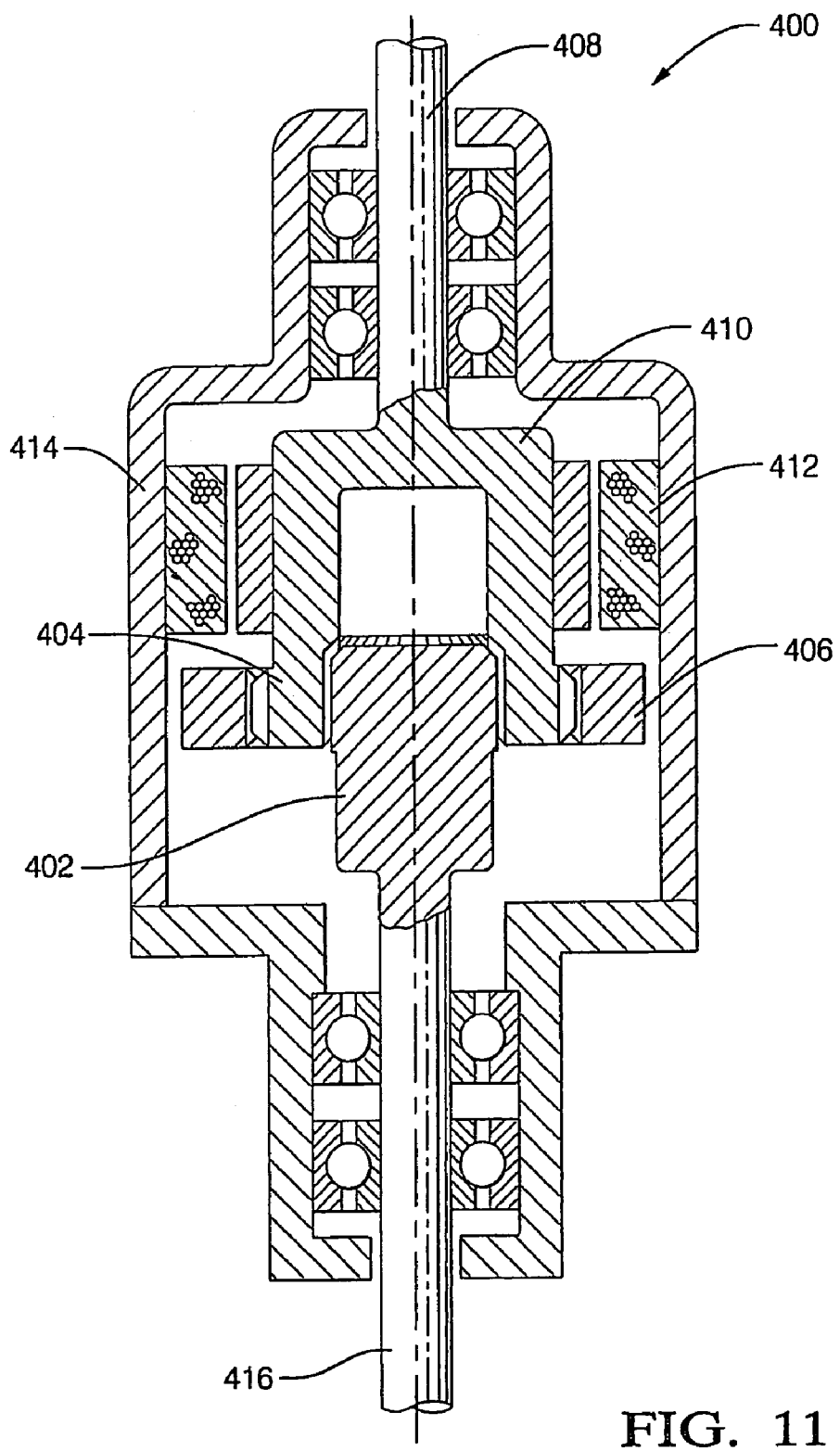
FIG. 11 is a side cross-sectional view of another embodiment of a vehicle steering device for use in the steering system of FIG. 1.

The exemplary embodiments may use the following concepts either singly or in combination to eliminate the problems described above. One of a class of differential mechanism trains may be used that retains efficiency while preloaded such as a harmonic drive, also known as "strain wave gearing", or a "cycloidal drive". While the gear systems such as shown in FIGS. 5 and 6 could also be preloaded, they may lose efficiency. Although they might experience a slight reduction of efficiency, because of friction from input to output, simply adding a more powerful motor would solve that issue. That is, while the embodiments of FIGS. 5 and 6 may have some friction, the friction from input to output is not experienced by the driver because the friction is not from input to ground. Harmonic drives and cycloidal drives are generally preloaded and lashless while maintaining low friction. Embodiments of differential mechanisms folded into the vehicle steering device have been previously described. Also, the use of an external wave generator may be used, as may the incorporation of a synchronous sensorless machine, as will be further described below. The mechanism may further be configured as shown in FIGS. 10-11 so that any friction due to the mesh preload is from input to output and not to ground. That is, the friction occurs between the input shaft and the output shaft, rather than between the input shaft and the housing, as has been previously experienced in prior embodiments. With any friction occurring only between the input shaft and output shaft, there is less feel to the driver with respect to friction.

FIG. 10 shows a vehicle steering device 350 using a harmonic drive and having an input shaft 352 that may be rotated to provide input rotation to a flex spline 354. The flex spline 354 may surround a wave generator 356, which may elastically deflect the flex spline 354 within a circular spline 358 which is connected to an output shaft 360. The vehicle steering device 350 may further include an actuator 364 having an actuator rotor 362 and an actuator stator 366. In this embodiment, the rotor shaft 374 is not hollow and connects to the wave generator 356 as shown. Thus, the rotor shaft 374 serves as an input augmentation shaft for the vehicle steering device 350. The actuator 364 may be a synchronous sensorless machine where the voltage is controlled as a function of boost (pressure). A brake 368 may also be employed which includes a brake rotor 370 and a brake stator 372. The brake stator may be a permanent magnet with coil to cancel the field. The stator 366, and its accompanying motor housing (not shown) are stationary with respect to rotation of the input shaft 352 and output shaft 360, thus no large inertial forces for rotating the complete actuator 364 is required, nor is incorporation of a spiral cable necessary, as it would be if the stator 366 rotated with a steering shaft. While the shaft 352 is described as the input shaft and shaft 360 is described as the output shaft, it should be understood that an inverse vehicle steering system is also within the scope of these embodiments wherein the output shaft 360 would serve as the steering shaft and the shaft 352 would serve as the output shaft.

With further reference to FIG. 10, in order to employ the above described concepts effectively, the rotor 362 of the actuator 364 is controlled with an electric machine that is magnetically coupled across a nonmagnetic portion of the mechanism as shown. That is, the portion of the flex spine 354 which passes through the air gap between the stator 366 and the rotor 352 is non-magnetic. The entire element that forms the flex spline 354 and its supporting structure which connects to the input shaft 352 may be formed from a non-magnetic material, or alternatively, since only the portion located between the air gap needs to be non-magnetic, the portion of the flex spline 354 which engages with the circular spline 358 may be made from a magnetic material, as may a portion of the supporting structure which connects the flex spline 354 to the input shaft 352. Manufacturing and durability factors may be taken into consideration when determining materials for forming the flex spline 354. It is desirable, in this embodiment, to run the machine as a sensorless synchronous machine. This can be achieved by controlling the angle of the flux vector in response to the desired rotor angle and the magnitude of the flux vector in response to the magnitude of the required torque. The required torque can be estimated from the steering torque as measured by the torque sensor in an electric steering system or a pressure sensor in a hydraulic steering system. There are also other ways to estimate the required torque using parameters such as handwheel position, handwheel velocity, vehicle velocity, and position augmentation velocity.

FIG. 11 shows a vehicle steering device 400 using a cup-type harmonic drive as the differential mechanism. The cup-type harmonic drive does not include a dynamic spline, as does the previously described pancake-type harmonic drives. Also, the flex spline is preloaded in cup-type harmonic drive differential mechanisms. The vehicle steering device 400 includes an input shaft 408 that may be attached to a support 410, which is a support from the input shaft 408 to the flex spline 404. The support 410 and flex spline 404 form the "cup". In contrast to the radial air gap machines used in the previous embodiments, the vehicle steering device 400 includes an axial air gap motor 414 having a stator 412 associated with a wave generator and rotor combination 406. The mechanism of vehicle steering device 400 may be turned "inside out" by placing a circular spline (rigid gear) 402 inside the flex spline 404 and a wave generator 406 on the outside, such as shown in FIG. 9. Then, using a hollow shaft motor 414, which may include the rotor 406 and stator 412, actuation can be achieved without placing intervening materials in the air gap and position sensors are easily implemented without requiring any form of telemetry, brushes or transformers. The circular spline 402 is connected to the output shaft 416 for output rotation. The rotor of the motor 414 provides input to the wave generator and rotor combination 406 and thus serves as the input augmentation shaft for the vehicle steering device 400. The stator 412 and its associated housing remain stationary with respect to rotation of the input shaft 408 and output shaft 416. While the shaft 408 is described as an input shaft, and shaft 416 is an output shaft, it should be understood that the shaft 416 could serve as an input shaft and 408 as the output shaft within an inverse of the system 400.

Further, in either FIG. 10 or FIG. 11, a brake may be implemented to prevent backdrive. In the vehicle steering devices 350, 400, safety elements as described with respect to the previous embodiments may be employed, as may a permanent magnet rotor with a hybrid stator be used to implement a machine that acts as a brake when de-energized and becomes free wheeling when energized.

In other embodiments, a vehicle steering system may be integrated at the pinion of a magnetic assist hydraulic steering system such as the Magnasteer™ steering system from Delphi steering. Magnasteer magnetic assist steering provides a vaiable torsional rate in the steering gear through the operation of a magnetic machine, which has been incorporated into the steering gear. A coil within the magnetic machine regulates the torsional rate of the device. During parking maneuvers, the steering effort is reduced by subtracting torsional rate from the valve. As vehicle speed increases, the torsional rate increases to provide improved highway feel and stability. Magnasteer magnetic assist steering offers a high degree of vehicle tunability—providing a wide range of effort between parking and highway operation. The Magnasteer system achieves variable-effort steering by electronically modulating the magnetic torsional rate.

Depending on the polarity of the current in the coil, the resulting alignment force is either additive or subtractive to the existing torsion bar rate.

Figure 12:
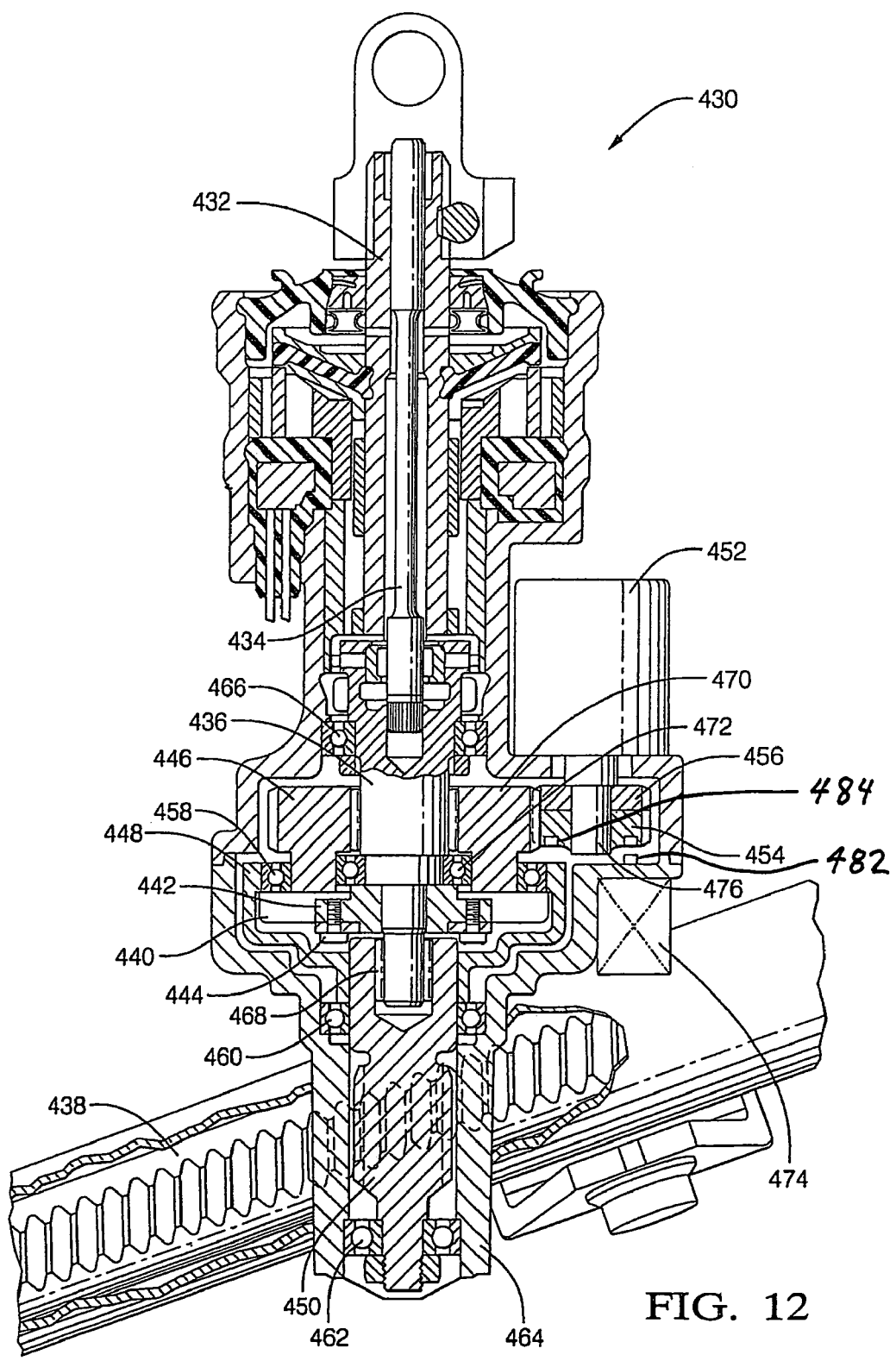
FIG. 12 is a side cross-sectional view of an alternate embodiment of a vehicle steering device.
Figure 13:
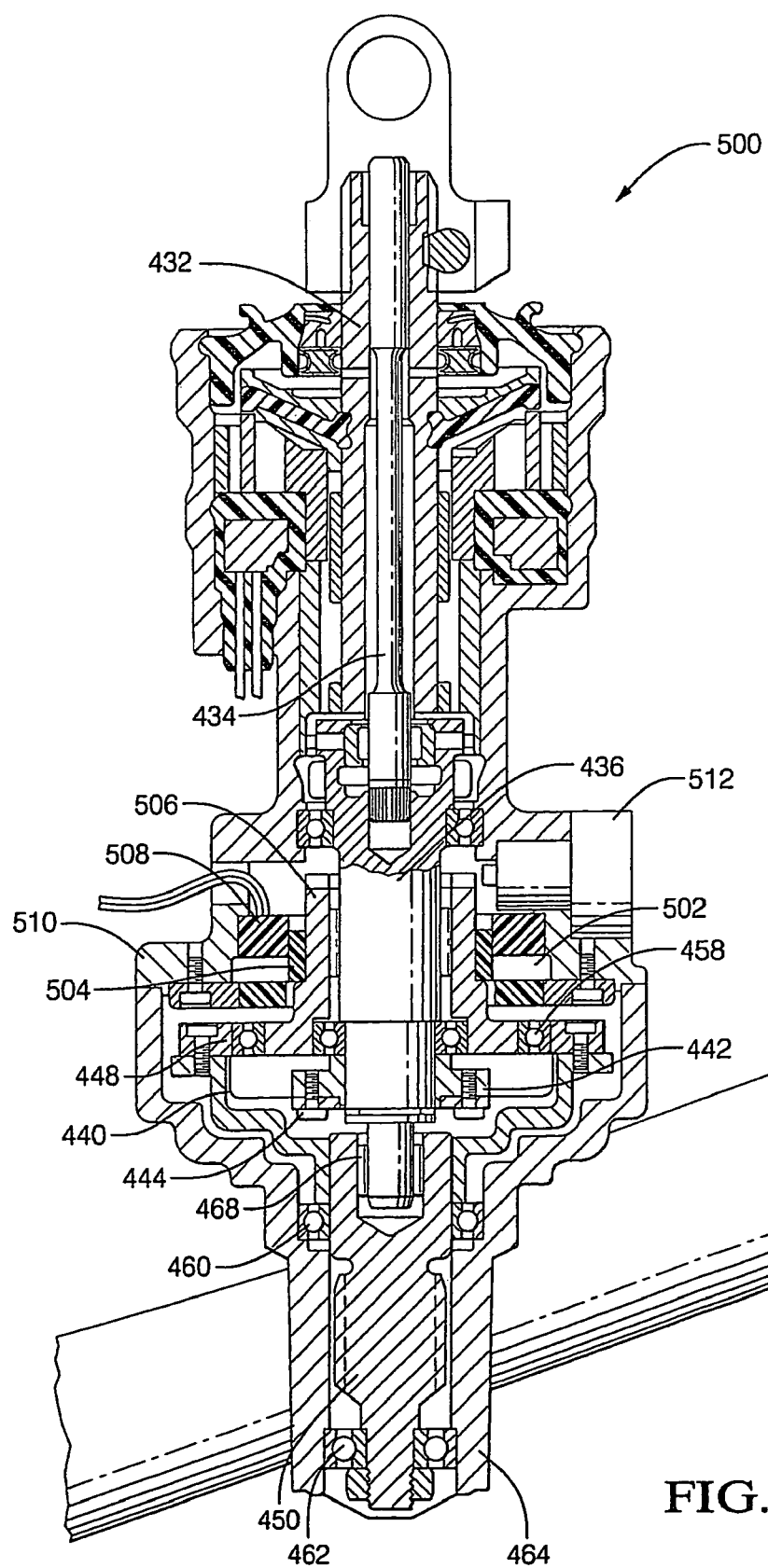
FIG. 13 is a side cross-sectional view of another alternate embodiment of a vehicle steering device; and, FIG. 14 is a side cross-sectional view of another alternate embodiment of a vehicle steering device.
Figure 14:
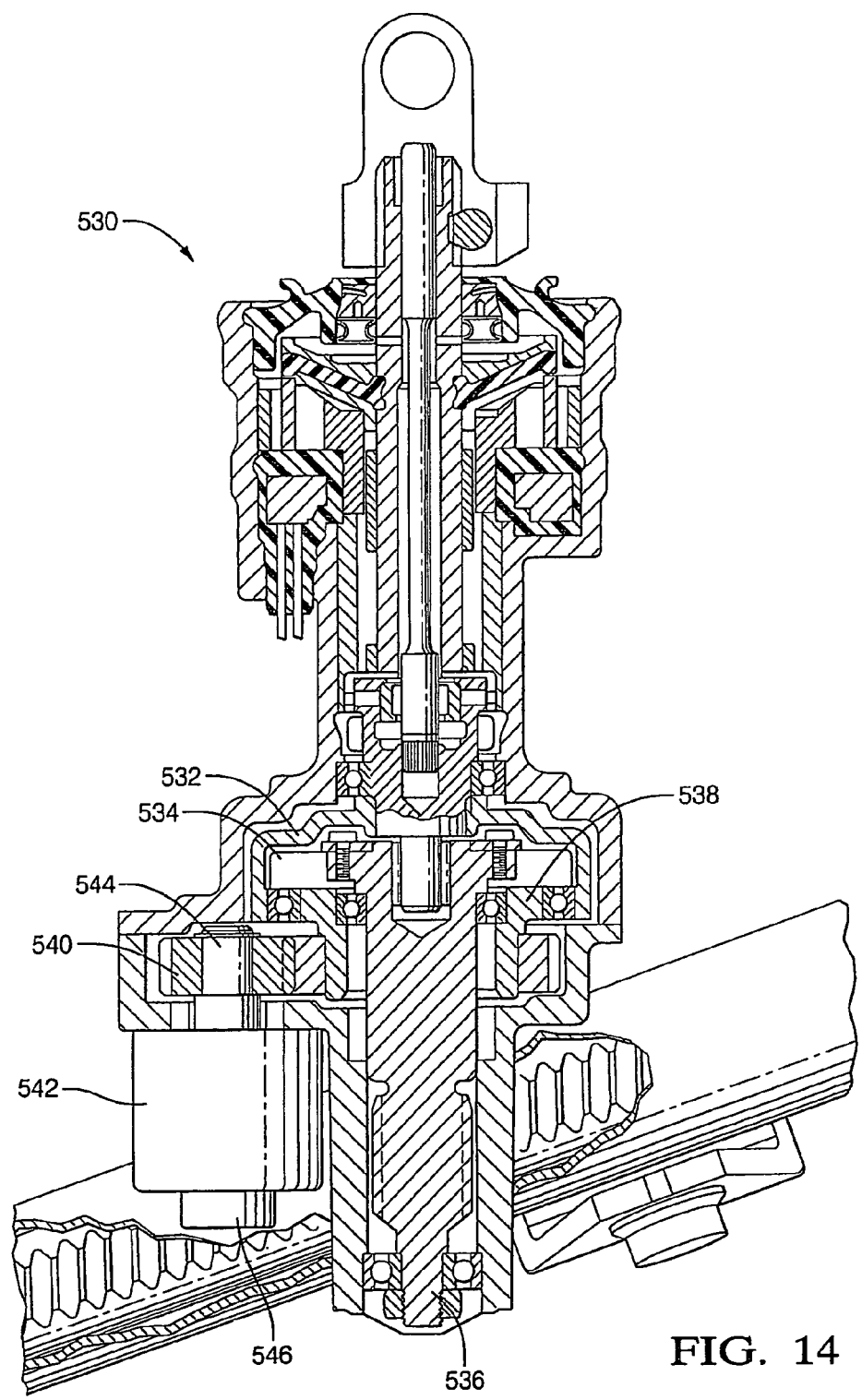

In FIGS. 12-14, while a specific embodiment of a magnetic assist steering system is disclosed, it should be understood that the vehicle steering systems of these embodiments may be employed in alternate types of steering systems, such as those disclosed in the earlier embodiments. Also, although the embodiments of FIGS. 12-14 is disclosed adjacent the pinion, it should be further understood that the vehicle steering systems of FIGS. 12-14 may be positioned anywhere along the steering shaft, upper shaft, or lower shaft. That is, each specific embodiment shown is exemplary of one mode of emploment, although other modes of employment are possible with each embodiment.

The magnetic assist steering system shown in FIGS. 12-14 may include a harmonic drive differential transmission with electric motor, which is powered from an electronic control unit. A locking mechanism may be utilized to lock variable rotation and thus the steering ratio from driver to tire road may remain unchanged. The system may have compact integration for easier installation in a vehicle. The magnetic assist steering system may provide the effort variation over electronically controlled magnetic torque, which acts as an addition or subtraction to the torsion bar torsion rate, effectively varying the feel of the hydraulic steering system. Variable steering effort provides light steering effort during parking maneuver and more precise efforts at highway speed.

FIG. 12 shows an active front steering actuator integrated with a magnetic assist steering hydraulic steering system. Within vehicle steering system 430, which may be employed in alternate systems as described above, a driver may rotate a steering wheel, a steering shaft, an intermediate shaft (all not shown), an upper shaft 432, a T-bar 434, and a lower shaft 436. Twisting T-bar 434 opens a valve for the hydraulic assist mechanism for moving rack 438. Lower shaft 436 may be connected with flex spline 440 of a harmonic drive over support 442 and screws 444. The harmonic drive used in this embodiment is a cup-type, which adds a little bit more axial length to the system versus the flatter pancake type, uses fewer parts because the dynamic spline is not required. That is, only one rigid spline is required in the cup-type, which, in this case, is circular spline 448. When the wave generator 446 is stationary, the flex spline 440 rotates the circular spline 448 with approximately a ratio of 1:1. The circular spline 448 is connected with pinion 450 that rotates and moves the rack 438 left or right depending on the input signals from the ECU, such as controller 28. While the circular spline 448 is shown connected with pinion 450, it should be understood that the vehicle steering system 430 is usable in other locations along the steering shaft and other upper and lower shafts, and therefore need not be connected directly to the pinion 450 as shown. Any suitable location is within the scope of this embodiment, and may be chosen based on the packaging requirements for a particular vehicle.

If sensors, such as those provided in FIG. 1, send signals to ECU, the ECU, e.g. controller 28, powers the electric motor 452 which rotates gear 454 (with delashing gear 456) and wave generator 446 over gear teeth. Although a delashing gear 456 is shown, other devices and systems for delashing may alternatively be used. The gear ratio may be optimally selected, as may the harmonic drive ratio may be optimized, depending on a particular embodiment and system requirements for a specific vehicle. The electric motor 452 is stationary with respect to rotation of the steering shaft, intermediate shaft, uppper shaft 432, T-bar 434, and lower shaft 436. The motor 452 may be connected to the housing 464 which is also stationary with respect to the rotation of the steering shaft, intermediate shaft, upper shaft 432, T-bar 434, and lower shaft 436. When the motor is actuated, the wave generator 446 rotates, over bearings 458, the flex spline 440 for providing additional rotation of the circular spline 448, and thus pinion 450. Pinion 450 may rotate inside bearings 460 and 462 in housing 464. The lower shaft 436 may rotate inside bearings 466 and 468. The wave generator 446 may rotate over bearings 470 and 472 over lower shaft 436.

If the system fails or if the system is off, then locking mechanism 474 may stop rotation of gear 454, electric motor 452 and wave generator 446. Although any suitable locking mechanism may be employed, the locking mechanism 474 may include a solenoid with a spring actuated plunger 482. The spring actuated plunger 482 may follow the longitudinal axis of the solenoid, which may be parallel to a longitudinal axis of the rotor shaft 476 of the motor 452. The gear 454 is shown to include at least one or more divots 484. In FIG. 12, the solenoid is shown in an unlocked position, where the plunger 482 is released from the divots 484 in the gear 454, thus allowing motion of the gear 454. In a locked position, the plunger 482 would insert into a divot 484 thus locking the gear 454 from further rotation. The solenoid may be energized to assume the unlocked position, and deenergized to assume the locking position. When rotation of gear 454, motor 452, and wave generator 446 is stopped, the ratio from driver input to road wheel is unchanged. While gear 454 has been described, in alternate embodiments, a belt transmission may be utilized instead of the gear 454 for transmitting rotation from the electric motor 452 to the wave generator 446. Since the wave generator 446 provides input rotation to the vehicle steering system 430, the wave generator 446 may be defined as an input augmentation shaft for the vehicle steering system 430. The wave generator 446 is collinear with the input shaft, which in this case is lower shaft 436.

In the embodiment shown in FIG. 12, the input rotation is from the driver over the flex spline 440. Additional input rotation is over the wave generator 446. Output rotation is over the circular spline 448 and may be defined as follows:

$$n_{cs}=(n_{fs} \times R/(R+1))+n_{wg}/(R+1)$$

The vehicle steering device 430 may be inverted as in the previous embodiments. That is, the lower shaft 436 may be formed as a pinion and the pinion 450 may be formed as an input shaft, such that input rotation to the circular spline 448 may be passed to the flex spline 440 which passes rotation to the lower shaft 436 over support 442. The wave generator 446 may provide additional input to the flex spline 440 for passing to the lower shaft 436. In such a reversed embodiment, the input rotation would be from the driver over the circular spline 448. The second input rotation would again be over the wave generator 446. The output rotation would be over the flex spline, and would be defined as follows:

$$n_{fs}=(n_{cs} \times (R+1)/R)+n_{wg}/R$$

In either arrangement, the motor housing and the stator of the motor 452 remains stationary with respect to rotation of the input shaft, as does the housing for the differential transmission, and thus a spiral cable is not required for these embodiments.

FIG. 13 shows another embodiment of an active front steering actuator integrated with a magnetic steering assist hydraulic steering system. The vehicle steering system 500 may include a brushless hollow electric motor 502. Rotor 504 may be connected with the wave generator 506. Brushless windings 508 are within housing 510, an outer stationary member. Wires 509 are provided for connection to the ECU. Locking mechanism 512 may lock the wave generator 506 for unchanged steering ratio. When ECU powers the locking mechanism 512, which unlocks the wave generator 506 and powers electric motor 502, the rotor 504 rotates wave generator 506 that produces additional variable steering rotation, and thus the rotor 504 is the input augmentation shaft for the system 500. The stator and motor housing of motor 502 and the housing for the differential transmission remain stationary during rotation of the input and output shafts, and thus a spiral cable is not required for this embodiment. All other functions of the system 500 may be similar to the system 430 of FIG. 12.

FIG. 14 shows an active front steering actuator with a magnetic steering assist hydraulic steering system similar to the system 430 shown in FIG. 12. The vehicle steering system 530 has input rotation over a circular spline 532. Flex spline 534 may be connected with the pinion 536. Wave generator 538 may be connected with gear 548. For additonal rotation, as determined by the ECU, electric motor 542 rotates gear 540 via rotor 544. Rotation of gear 540 rotates gear 548 which rotates the wave generator 538 for providing additional input to the system 530. The wave generator 538 provides the additional input to the system 530 and therefore may be defined as the input augmentation shaft for the system 530. The wave generator 538 may also be collinear with the input shaft, in this case the lower shaft 436, of the system 530. Locking mechanism 546 may be on electric motor 542 for the purposes previously described. As an alternative packaging arrangement, the electric motor 542 may be installed in an opposite direction from up to down, that is, with the motor 542 positioned adjacent to the differential transmission housing 550 and the rotor 544 extending from the motor 542 in a direction towards the rack 438. In such an embodiment, the longitudinal axis of the motor 542 may need to be spaced further from the longitudinal axis of the pinion 536 than what is shown in FIG. 14 because of space considerations, and therefore a belt transmission may be preferable over a gear transmission in such a case. In any case, the packaging design may be determined based on the final intended application and does not affect the function of the vehicle steering system 530.

Although FIGS. 12 and 14 demonstrate vehicle steering systems which include motors having a rotor shaft which is not collinear with an input shaft, but which is parallel to the input shaft, it should be understood that these embodiments still relate to active front steering systems having a differential mechanism which minimizes friction to ground because any friction in these systems is essentially limited to friction between the input shaft and the output shaft. These systems all include motor housings and stators of motors that are stationary with respect to rotation of input and output shafts. Furthermore, these systems still include input augmentation shafts which are collinear with an input shaft of the vehicle steering system. Because these embodiments include offset motors, the rotor shaft size may be decreased, which may result in decreased cost of the overall system, although the extra cost of the gear, belt, or other transmission for connecting the rotor to the input augmentation shaft must be factored in. Thus, these embodiments provide additional design and packaging options for a vehicle steering system.

A method utilizing the features of the above described embodiments may include providing variable ratio steering to a vehicle steering device by providing an electronic control unit, sensing rotation of an input shaft of the vehicle steering device and sending a first signal to the electronic control unit, sending a second signal to a motor, the motor having a motor casing and stator, wherein the second signal dictates rotation of a rotor shaft of the motor, an input augmentation shaft sharing a common longitudinal axis with the input shaft, rotating the rotor shaft as determined by the second signal, wherein the rotor shaft rotates a variable gear mechanism, the variable gear mechanism connecting the input shaft to an output shaft of the vehicle steering device, and maintaining the stator stationary with respect to rotation of the input shaft and output shaft. The method may further include the use of other elements, as described in the figures, within the above described embodiments.

Thus, systems and methods for vehicle steering devices have been described wherein a motor casing and stator advantageously do not rotate with an input shaft of the steering system, thus decreasing the inertial forces encountered when turning a hand wheel, as compared to a system wherein the motor casing and stator rotate with the steering shaft. A differential mechanism housing may also advantageously be fixed relative to rotation of the steering shaft, which further decreases the inertial forces. The stationary electric motor employed in the embodiments does not require a spiral cable, thus advantageously eliminating the need for additional assembly of a spiral cable. An external wave generator has also advantageously been described, as has the incorporation of a sensorless synchronous machine. Additional embodiments are described that include an offset motor while maintaining the other features and advantages of the other embodiments by having an input augmentation shaft collinear with the input shaft. Because the embodiments are designed as reversible, with the input shafts and output shafts exchangeable, the road feedback gets passed to the driver as the output shaft provides torque.

While the invention has been described with reference to an exemplary embodiment, it will be understood by those skilled in the art that various changes may be made and equivalents may be substituted for elements thereof without departing from the scope of the invention. Terms such as "first" and "second" are used herein merely to distinguish between two like elements, and are not intended to imply an order such as of importance or location. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A vehicle steering device comprising:
   a rotatable input shaft;
   a rotatable output shaft;
   an input augmentation shaft, the input augmentation shaft the input shaft and the output shaft sharing a longitudinal axis;
   a differential mechanism for providing variable ratio steering to the steering device, wherein the input augmentation shaft provides a variable rotational ratio between the input shaft and the output shaft; and
   a motor in communication with the input augmentation shaft, the motor further having a motor stator, the motor stator being stationary with respect to rotation of the input shaft and a ratio of the steering device being approximately one to one in response to the motor not operating.

2. The vehicle steering device of claim 1 wherein the input shaft is a steering shaft connected to a hand wheel.

3. The vehicle steering device of claim 1 wherein the motor receives an input signal from an electronic control unit.

4. The vehicle steering device of claim 1 further comprising a motor housing for housing the motor, wherein the motor housing is stationary with respect to rotation of the input shaft.

5. The vehicle steering device of claim 1 further comprising a housing surrounding the differential mechanism, wherein the housing is stationary with respect to rotation of the input shaft.

6. The vehicle steering device of claim 5 further comprising bearings positioned between the housing and the input shaft for allowing rotation of the input shaft within the housing.

7. The vehicle steering device of claim 1 wherein the output shaft is connected to the differential mechanism, and the output shaft is coaxial with the input augmentation shaft.

8. The vehicle steering device of claim 7 wherein the input augmentation shaft is a wave generator in communication with a rotor shaft of the motor.

9. The vehicle steering device of claim 7 wherein the input augmentation shaft is a rotor shaft of the motor.

10. The vehicle steering device of claim 9 wherein the rotor shaft is hollow and the output shaft passes coaxially through the rotor shaft.

11. The vehicle steering device of claim 10 further comprising bearings positioned between the rotor shaft and the output shaft.

12. The vehicle steering device of claim 1 wherein the differential mechanism comprises a circular spline, flex spline, and a dynamic spline, wherein the input shaft rotates the circular spline which rotates the flex spline, which rotates the dynamic spline, which rotates the output shaft of the vehicle steering device.

13. The vehicle steering device of claim 12 wherein the differential mechanism is a pancake type harmonic drive.

14. The vehicle steering device of claim 12 further comprising a support connecting the dynamic spline to the output shaft.

15. The vehicle steering device of claim 12 further comprising a support connecting the input shaft to the circular spline.

16. The vehicle steering device of claim 12 wherein the differential mechanism further comprises a wave generator within the flex spline, wherein the wave generator is rotated by the input augmentation shaft.

17. The vehicle steering device of claim 1 further comprising a safety element for stopping rotation of a rotor of the motor during a system failure.

18. The vehicle steering device of claim 17 wherein the safety element is selected from a set including a magnetorheological fluid stopper, an electromagnetic clutch, a brake, a grip, and a solenoid.

19. The vehicle steering device of claim 17 wherein the safety element includes a spring actuated plunger parallel to a longitudinal axis of the rotor, wherein the plunger is extended when the safety element is deenergized for stopping rotation of the rotor, and retracted when the safety element is energized for allowing rotation of the rotor.

20. A method of providing variable ratio steering to a vehicle steering device, the method comprising:

providing an electronic control unit;

sensing rotation of an input shaft of the vehicle steering device and sending a first signal to the electronic control unit;

sending a second signal to a motor, the motor having a stator, wherein the second signal dictates rotation of an input augmentation shaft in communication with the motor, the input augmentation shaft sharing a common longitudinal axis with the input shaft;

rotating the input augmentation shaft as determined by the second signal, wherein the input augmentation shaft rotates a differential mechanism, the differential mechanism connecting the input shaft to an output shaft of the vehicle steering device with a variable rotational ratio depending upon the rotation of the input augmentation shaft, the differential mechanism maintaining a near one to one ratio of the input shaft with the output shaft when the input augmentation shaft is not rotating; and, maintaining the stator stationary with respect to rotation of the input shaft and output shaft.

* * * * *